US011012930B2

(12) United States Patent
Gao et al.

(10) Patent No.: US 11,012,930 B2
(45) Date of Patent: May 18, 2021

(54) DYNAMIC SPECTRUM RESOURCE ALLOCATION FOR FULL SPECTRUM SHARING

(71) Applicant: HUAWEI TECHNOLOGIES CO., LTD., Guangdong (CN)

(72) Inventors: Quanzhong Gao, Shanghai (CN); Yanmin Qin, Shanghai (CN); Lin Zhou, Shanghai (CN); Fazhong Si, Shenzhen (CN); Liping Yang, Shanghai (CN); Jiyu Ye, Shanghai (CN); Shuqin Xiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/407,391

(22) Filed: May 9, 2019

(65) Prior Publication Data

US 2019/0268838 A1 Aug. 29, 2019

Related U.S. Application Data

(63) Continuation of application No. PCT/CN2016/105531, filed on Nov. 11, 2016.

(51) Int. Cl.
*H04W 72/04* (2009.01)
*H04W 48/18* (2009.01)
(Continued)

(52) U.S. Cl.
CPC .......... *H04W 48/18* (2013.01); *H04W 16/10* (2013.01); *H04W 16/14* (2013.01); *H04W 48/14* (2013.01);
(Continued)

(58) Field of Classification Search
CPC ..... H04W 48/18; H04W 16/10; H04W 16/14; H04W 48/14; H04W 72/042;
(Continued)

(56) References Cited

U.S. PATENT DOCUMENTS

2006/0286986 A1* 12/2006 Kim ...................... H04W 16/00 455/450
2011/0044218 A1 2/2011 Kaur et al.
(Continued)

FOREIGN PATENT DOCUMENTS

CN 102223640 A 10/2011
CN 102264110 A 11/2011
(Continued)

OTHER PUBLICATIONS

PCT International Search Report and Written Opinion issued in International Application No. PCT/CN2016/105531 dated Aug. 2, 2017, 15 pages (with English translation).
(Continued)

*Primary Examiner* — Pakee Fang
(74) *Attorney, Agent, or Firm* — Fish & Richardson P.C.

(57) ABSTRACT

The present disclosure relates to spectrum resource allocation methods. One example method includes a base station obtains, in real time, a network access request message from a terminal, where the network access request message includes at least one of a network standard supported by the terminal, an access service of the terminal, or QoS of the access service, the base station dynamically allocates spectrum resources to different network standards based on the network access request message, and the base station sends a first network standard access indication message to the terminal, where the terminal accesses a service based on the first network standard access indication message via a corresponding network standard.

14 Claims, 10 Drawing Sheets

(51) Int. Cl.
*H04W 16/10* (2009.01)
*H04W 48/14* (2009.01)
*H04W 72/08* (2009.01)
*H04W 72/10* (2009.01)
*H04W 16/14* (2009.01)

(52) U.S. Cl.
CPC ....... *H04W 72/042* (2013.01); *H04W 72/048* (2013.01); *H04W 72/0453* (2013.01); *H04W 72/08* (2013.01); *H04W 72/087* (2013.01); *H04W 72/10* (2013.01)

(58) Field of Classification Search
CPC ........... H04W 72/0453; H04W 72/048; H04W 72/08; H04W 72/087; H04W 72/10
See application file for complete search history.

(56) References Cited

U.S. PATENT DOCUMENTS

| | | |
|---|---|---|
| 2011/0205941 A1 | 8/2011 | Stanforth |
| 2012/0014332 A1* | 1/2012 | Smith .................. H04W 16/14 370/329 |
| 2012/0322499 A1* | 12/2012 | Wei ...................... H04W 36/24 455/525 |
| 2013/0279376 A1 | 10/2013 | Ahmadi et al. |
| 2014/0080535 A1 | 3/2014 | Gauvreau et al. |
| 2015/0237645 A1 | 8/2015 | Andrianov et al. |
| 2015/0296560 A1 | 10/2015 | Sadek et al. |
| 2016/0037544 A1 | 2/2016 | Wang |
| 2016/0255639 A1* | 9/2016 | Chen ..................... H04W 72/02 370/336 |
| 2017/0034706 A1 | 2/2017 | Ericson et al. |

FOREIGN PATENT DOCUMENTS

| | | |
|---|---|---|
| CN | 103391597 A | 11/2013 |
| CN | 104159234 A | 11/2014 |
| CN | 105794247 A | 7/2016 |
| EP | 1863303 A1 | 12/2007 |
| EP | 2874432 A1 | 5/2015 |
| JP | 2006512824 A | 4/2006 |
| JP | 2007158568 A | 6/2007 |

OTHER PUBLICATIONS

Extended European Search Report issued in European Application No. 16921327.9 dated Oct. 2, 2019, 9 pages.
Office Action issued in Indian Application No. 201917020190 dated Nov. 27, 2020, 5 pages.
Office Action issued in Chinese Application No. 201680090637.1 dated May 28, 2020, 9 pages.
Office Action issued in Japanese Application No. 2019-524166 dated Jun. 30, 2020, 6 pages (with English translation).
EPO Communication pursuant with Article 94(3) EPC issued in European Application No. 1692327.9 dated Mar. 9, 2021, 7 pages.

* cited by examiner

DYNAMIC SPECTRUM RESOURCE ALLOCATION FOR FULL SPECTRUM SHARING

CROSS-REFERENCE TO RELATED APPLICATIONS

This application is a continuation of International Application No. PCT/CN2016/105531, filed on Nov. 11, 2016, the disclosure of which is hereby incorporated by reference in its entirety.

TECHNICAL FIELD

Embodiments of the present invention relate to the field of communications technologies, and in particular, to a spectrum resource allocation method and apparatus for full spectrum sharing.

BACKGROUND

With popularization of intelligent terminals and rise of Internet of Everything, various mobile broadband (Mobile broadband, MBB) services and a virtual reality (Virtual Reality, VR)/an augmented reality (Augmented Reality, AR) service, mobile communications technologies have developed rapidly and have quickly evolved from 2G/3G to 4G 5G deployment is also put on the agenda. However, spectrum resources are always most precious resources for an operator. In particular, a frequency band used by a current mobile system has an obvious advantage over a future 5G high frequency/super high frequency band in terms of propagation characteristics, and will still be hot in a future 5G era. How to properly utilize spectrum resources and maximally improve spectrum efficiency is an eternal topic.

Currently, some studies have been made on full utilization of the spectrum resources and improvement of the spectrum efficiency, for example, to fixedly partition, by utilizing non-standard bandwidth, spectrums for use by a high-standard system and a low-standard system; to semi-statically partition in different time segments, based on different traffic loads of the high-standard system and the low-standard system, spectrums for use by the high-standard system and the low-standard system; and to implement dynamic sharing of a small portion of resources, taken from the spectrums, between the high-standard system and the low-standard system. These spectrum sharing technologies have an effect. However, because sharing is not flexible enough or a sharing granularity is very limited, it is difficult to meet a requirement of an operator for maximizing the spectrum efficiency.

SUMMARY

To overcome the foregoing problems in the prior art, embodiments of the present invention provide a spectrum resource allocation method and apparatus for full spectrum sharing.

According to a first aspect, an embodiment of the present invention provides a spectrum resource allocation method for full spectrum sharing, including:

obtaining, by a base station in real time, a network access request message sent by a terminal, where the network access request message includes at least one of the following: a network standard supported by the terminal, an access service of the terminal, and quality of service QoS of the access service;

dynamically allocating, by the base station, spectrum resources to different network standards based on the network access request message; and sending, by the base station, a first network standard access indication message to the terminal, so that the terminal accesses a service based on the first network standard access indication message via a corresponding network standard.

In a possible implementation provided in this embodiment of the present invention, the method further includes:

sending, by the base station, signals of a plurality of different network standards to the terminal, where the signals of the plurality of different network standards work on a same spectrum resource; and communicating, by the base station, with the terminal via the same resource spectrum.

In a possible implementation provided in this embodiment of the present invention, the dynamically allocating, by the base station, spectrum resources to different network standards based on the network access request message includes:

separately obtaining, by the base station based on the access service of the terminal and the QoS of the access service, time-frequency resources that are occupied by the different network standards during service access; and allocating, by the base station, the spectrum resources to the different network standards based on the time-frequency resources that are occupied by the different network standards.

In a possible implementation provided in this embodiment of the present invention, the dynamically allocating, by the base station, spectrum resources to different network standards based on the network access request message includes:

obtaining, by the base station, network priorities of the different network standards based on the network access request message; and allocating, by the base station, the spectrum resources to the different network standards based on a sequence of the network priorities.

In a possible implementation provided in this embodiment of the present invention, the method further includes:

obtaining, by the base station, measurement information sent by the terminal;

when it is determined based on the measurement information that communication quality of the terminal cannot meet the QoS of the access service, allocating, by the base station, the spectrum resources to the different network standards based on the network priorities; and sending, by the base station, a second network standard access indication message to the terminal, so that the terminal accesses a service based on the second network standard access indication message via a corresponding network standard.

In a possible implementation provided in this embodiment of the present invention, the obtaining network priorities of the different network standards includes:

separately obtaining, by the base station, a score of a spectrum resource used by each of network standards that are supported by the terminal, a score of a access service priority, and a score of a user importance index;

separately obtaining, by the base station, a weight corresponding to the score of the spectrum resource, a weight corresponding to the score of the access service priority, and a weight corresponding to the score of the user importance index; and calculating, by the base station, the network priorities of the different network standards based on the score of the spectrum resource, the score of the access service priority, the score of the user importance index, the weight corresponding to the score of the spectrum resource, the weight corresponding to the score of the access service priority, and the weight corresponding to the score of the user importance index.

In a possible implementation provided in this embodiment of the present invention, the method further includes:

separately obtaining, by the base station, first uplink data that is sent via a first network standard by the terminal and second uplink data that is sent via a second network standard by the terminal, where a spectrum resource used by the first network standard partially or completely overlaps with a spectrum resource used by the second network standard; and separately performing, by the base station, interference processing on the first uplink data and the second uplink data.

According to a second aspect, an embodiment of the present invention further provides a spectrum resource allocation apparatus for full spectrum sharing, including:

a receiver, configured to obtain, in real time, a network access request message sent by a terminal, where the network access request message includes at least one of the following: a network standard supported by the terminal, an access service of the terminal, and quality of service QoS of the access service;

a processor, configured to dynamically allocate spectrum resources to different network standards based on the network access request message; and a transmitter, configured to send a first network standard access indication message to the terminal, so that the terminal accesses a service based on the first network standard access indication message via a corresponding network standard.

In a possible implementation provided in this embodiment of the present invention, the transmitter is further configured to send signals of a plurality of different network standards to the terminal, where the signals of the plurality of different network standards work on a same spectrum resource; and the processor is further configured to communicate with the terminal via the same resource spectrum.

In a possible implementation provided in this embodiment of the present invention, the processor is further configured to separately obtain, based on the access service of the terminal and the QoS of the access service, time-frequency resources that are occupied by the different network standards during service access; and the processor is further configured to allocate the spectrum resources to the different network standards based on the time-frequency resources that are occupied by the different network standards.

In a possible implementation provided in this embodiment of the present invention, the receiver is further configured to obtain network priorities of the different network standards based on the network access request message; and the processor is further configured to allocate the spectrum resources to the different network standards based on a sequence of the network priorities.

In a possible implementation provided in this embodiment of the present invention, the receiver is further configured to obtain measurement information sent by the terminal;

the processor is further configured to: when it is determined based on the measurement information that communication quality of the terminal cannot meet the QoS of the access service, allocate the spectrum resources to the different network standards based on the network priorities; and the transmitter is further configured to send a second network standard access indication message to the terminal, so that the terminal accesses a service based on the second network standard access indication message via a corresponding network standard.

In a possible implementation provided in this embodiment of the present invention, the receiver is further configured to separately obtain a score of a spectrum resource used by each of network standards that are supported by the terminal, a score of a access service priority, and a score of a user importance index;

the receiver is further configured to obtain a weight corresponding to the score of the spectrum resource, a weight corresponding to the score of the access service priority, and a weight corresponding to the score of the user importance index; and the processor is further configured to calculate the network priorities of the different network standards based on the score of the spectrum resource, the score of the access service priority, the score of the user importance index, the weight corresponding to the score of the spectrum resource, the weight corresponding to the score of the access service priority, and the weight corresponding to the score of the user importance index.

In a possible implementation provided in this embodiment of the present invention, the receiver is further configured to separately obtain first uplink data that is sent via a first network standard by the terminal and second uplink data that is sent via a second network standard by the terminal, where a spectrum resource used by the first network standard partially or completely overlaps with a spectrum resource used by the second network standard; and the processor is further configured to separately perform interference processing on the first uplink data and the second uplink data.

DESCRIPTION OF EMBODIMENTS

Acronyms and Definitions of Key Terminologies

GSM: Global System for Mobile Communications
LTE: Long Term Evolution
UMTS: Universal Mobile Telecommunications System
CDMA: Code Division Multiple Access
TD-SCDMA: Time Division-Synchronous Code Division Multiple Access
QoS: quality of service
FDD: frequency division duplex
TDD: time division duplex
VR/AR: virtual reality virtual reality/augmented reality augmented reality
MBB: mobile broadband
UE: user equipment
CA: carrier aggregation
DC/MC: dual-carrier/multi-carrier High-standard/low-standard system: A high-standard/low-standard system of a terminal in this specification is a mobile communications system that is distinguished based on high or low spectrum efficiency. Usually, an early system that has low spectrum efficiency is a low-standard system, and a later system that has high spectrum efficiency is a high-standard system. This concept is a relative definition, and a specific system represented by this concept will change with development of communications systems.

Technical Solution of an Existing Technology 1

Figure 1:
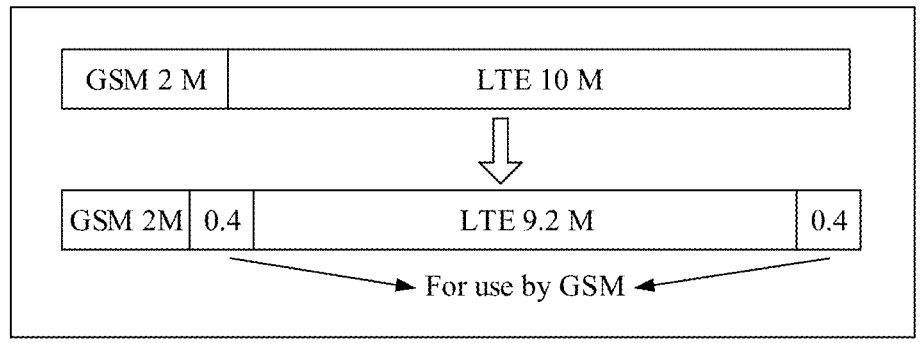
FIG. 1 is a schematic diagram of statically partitioning resources.

FIG. 1 is a schematic diagram of semi-statically partitioning resources. As shown in FIG. 1, spectrum resources are statically partitioned in an existing technology 1. The spectrum resources are more properly partitioned by cutting down on spectral resources to be used by a standard that occupies substantial spectrum resources. For example, for a scenario in which a GSM system and an LTE system coexist in a same frequency band, an operator has a total of 12 M spectrum resources. As services of the GSM system decrease and service demands of the LTE system increase, most spectrum resources are provided for the LTE system to use. For example, 10 M is provided for the LTE system, so that spectrum efficiency can be maximized. However, users of the GSM system do not decrease so fast. In this case, remaining resources are provided to the GSM system, and congestion occurs when the GSM system is busy with services. Therefore, the spectrum resources of the LTE system, that is, the using 10 M, can be reduced. For example, 0.8 M is taken out for the GSM system to use. However, this causes a performance loss of the LTE system. As more bandwidth of the LTE system is reduced, more resources may be spared for the GSM system to use and benefits from the spectrum resources are fewer.

Disadvantages of the Existing Technology 1

In the existing technology 1, spectrums can only be fixedly partitioned for a high-standard system and a low-standard system to use. If more spectrums are allocated to the high-standard system, the low-standard system may have insufficient resources when being busy; and if fewer spectrums are allocated to the high-standard system, a spectrum resource may be wasted when the low-standard system is idle with light traffic.

An Existing Technology 2 Related to the Present Invention

Technical Solution of the Existing Technology 2

Figure 2:
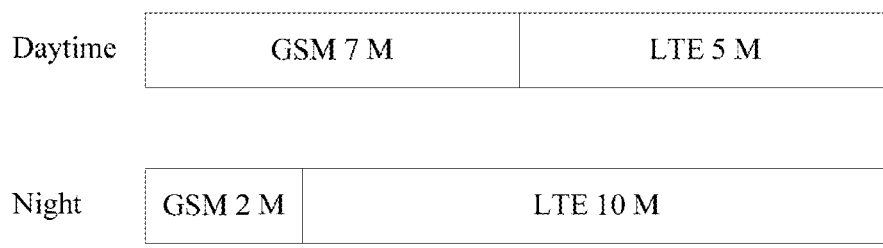
FIG. 2 is a schematic diagram of semi-statically partitioning spectrum resources.

FIG. 2 is a schematic diagram of semi-statically partitioning spectrum resources. As shown in FIG. 2, an existing technical solution 2 is an improvement of the existing technical solution 1, to resolve the problem of spectrum efficiency when a system is busy with high traffic or idle with light traffic. In this solution, the spectrum resources are partitioned correspondingly based on traffic peaks of the high-standard and low-standard systems. When the low-standard system is busy with high traffic and the high-standard system is idle with light traffic, relatively more resources are allocated to the low-standard system and resources that have relatively large bandwidth are allocated to the high-standard system. When the low-standard system is idle with light traffic and the high-standard system is busy with high traffic, relatively fewer resources are allocated to the low-standard system and resources that have relatively small bandwidth are allocated to the high-standard system. Usually, spectrum resources are simply partitioned in the two manners, and the two manners correspond to the two traffic cases respectively. Because this relates to bandwidth conversion of a particular system and the bandwidth conversion causes restart of a radio frequency unit or a cell, the two spectrum resource solutions are switched at a very low frequency. For example, there are still 12 M spectrum resources for a GSM system and an LTE system to use. In the daytime, to meet a requirement of the GSM system busy with services, the GSM system uses 7 M spectrum resources and the LTE system uses 5 M spectrum resources. At night, traffic of the GSM system is relatively light, and data traffic of the LTE system is relatively high, and therefore the GSM system uses 2 M spectrum resources and the LTE system uses 10 M spectrum resources. When the traffic of the GSM system decreases at night and the traffic of the GSM increases in the early morning, the two spectrum solutions are switched.

Disadvantages of the Existing Technology 2

Similar to the existing technology 1, flexibility of semi-statically partitioning the spectrum resources is relatively poor, and the spectrum resources can only be relatively statically allocated to the high-standard and low-standard systems. This solution is suitable for a scenario in which an obvious difference exists between traffic of the high-standard system and traffic of the low-standard system and a time granularity is very coarse. Traffic models of cells in an existing network are different. It is very difficult to find an application scenario for such spectrum allocation.

An Existing Technology 3 Related to the Present Invention

Technical Solution of the Existing Technology 3

Figure 3:
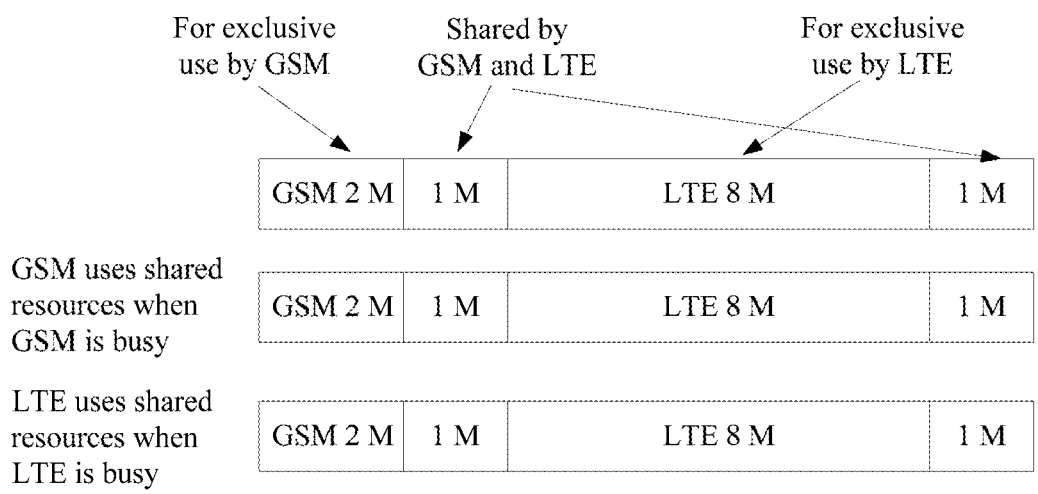
FIG. 3 is a schematic diagram of partial spectrum resource sharing according to an embodiment of the present invention.

FIG. 3 is a schematic diagram of partial spectrum resource sharing. As shown in FIG. 3, an existing technical solution 3 is a solution of partial spectrum resource sharing. In this technology, a total spectrum is partitioned into three segments: spectrums for exclusive use by the high-standard and low-standard systems at two ends, and a remaining segment for sharing between the high-standard and low-standard systems. Whether the shared spectrum resources are provided for the high-standard system or the low-standard system to use is determined based on a particular sharing principle and in combination with a real-time change status of traffic. For example, there are still 12 M spectrum resources for a GSM system and an LTE system to use. A 2 M spectrum is for exclusive use by the GSM system, an 8 M spectrum is for exclusive use by the LTE system, and a remaining 2 M spectrum is used as spectrum resources shared between the GSM system and the LTE system. When the GSM system is busy with services but the LTE system is idle with services, the 2 M shared spectrum resources are provided for the GSM system to use; or when the GSM system is idle but the LTE system is busy with services, the 2 M shared spectrum resources are provided for the LTE system to use. The shared spectrum is allocated in real time as required, with relatively high flexibility.

Disadvantages of the Existing Technology 3

Compared with the existing technologies 1 and 2, the existing technology 3 is relatively flexible, and also meets an actual service condition of a network. However, it is still very difficult for the existing technology 3 to meet requirements of a current operator. Because a proportion of resources that can be used for spectrum sharing to total spectrum resources is very limited, benefits of the sharing are also very limited. In particular, total spectrum resources of an operator are often very limited. Even if the existing technology 3 is used, it is still difficult for the operator to simultaneously consider feeling and experience of some end users of the low-standard system while using the high-standard system to improve spectrum efficiency and commercial competitiveness.

DETAILED DESCRIPTIONS OF THE TECHNICAL SOLUTIONS OF THE PRESENT INVENTION

Technical Problem to be Resolved by the Present Invention

With emergence of 4G/5G technologies, demands for old 2G/3G services are ever decreasing. However, old end users will not completely retire in a short time, that is, a "long tail effect" exists. Considering limitations of the existing technologies for efficiently utilizing spectrum resources and to meet requirements of an operator to maximize spectrum efficiency and bring more commercial value, the present invention proposes a solution in which a mobile network of a plurality of standards performs full resource sharing on a same spectrum resource. With this technology, full sharing of a spectrum between standards can be implemented in combination with characteristics of the operator's spectrum bandwidth and via an advanced filter, an interference reduction/resistance/avoidance technology, joint resource scheduling and management between standards, and the like. For example, a same spectrum is fully shared between a GSM system, a UMTS system, and an LTE system; or between a GSM system, an LTE system, and a 5G system; or between a UMTS system, an LTE system, and a 5G system.

SPECIFIC EMBODIMENTS OF TECHNICAL IMPLEMENTATION OF THE PRESENT INVENTION

Embodiment 1 of the Present Invention

Spectrum resources of an operator are just sufficient for networking, and meet a minimum-bandwidth requirement of each standard. Embodiment 1 has mainly taken a most common FDD network among mobile communications networks into consideration, that is, a case in which GSM, UMTS, and LTE coexist. Bandwidth of each carrier frequency of a GSM system is 200 kHz, but the GSM system has a particular frequency reuse requirement. For example, frequency reuse of 4*3 needs to be met. If one carrier frequency per cell is met, total bandwidth resources required=Bandwidth per carrier frequency*Number of frequencies=200 kHz*12=2.4 MHz. System bandwidth of each carrier frequency of a UMTS system is 5 MHz. LTE supports 1.4/3/5/10/15/20 MHz. However, larger system bandwidth can better reflect high spectrum efficiency of an LTE system. Usually, required system bandwidth of an LTE network is 5 MHz or higher. Therefore, Embodiment 1 of the present invention has taken into consideration a case in which a total spectrum of an operator is 5 MHz and systems of three standards GSM/UMTS/LTE can be simultaneously deployed. In this case, a complex interference relationship between the systems of the standards on a limited spectrum determines that it is impossible to implement the foregoing networking based on an existing networking technology. The present invention breaks through current technical limitations and can perform spectrum resource sharing between a plurality of standards within a limited spectrum.

Figure 4:
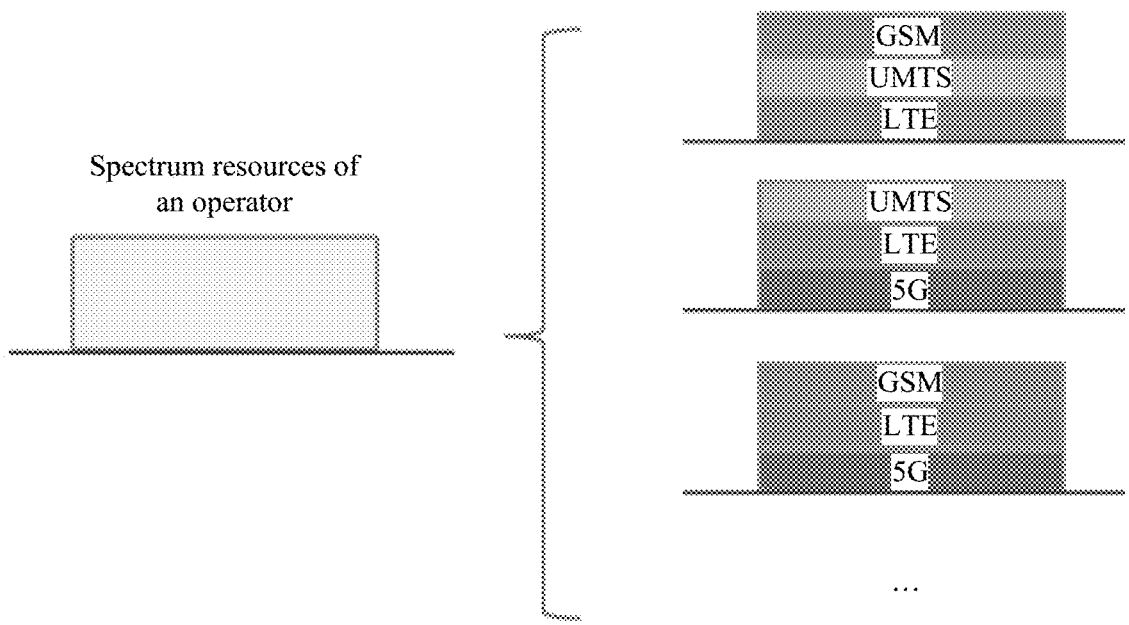
FIG. 4 is a schematic diagram of a combination for full spectrum sharing according to an embodiment of the present invention.

FIG. 4 is a schematic diagram of a combination for full spectrum sharing according to an embodiment of the present invention. As shown in FIG. 4, the present invention starts from the following aspects to resolve a problem of interference between systems of various standards and to implement real full spectrum sharing:

1. Formulate a spectrum usage priority policy.
2. Connect a user to a network of a most proper standard.
3. Perform proper resource scheduling based on a status of interference between the standards.
4. Perform joint interference reduction and resistance management on a plurality of standards that work simultaneously, to ensure quality of spectrum sharing.

Figure 5:
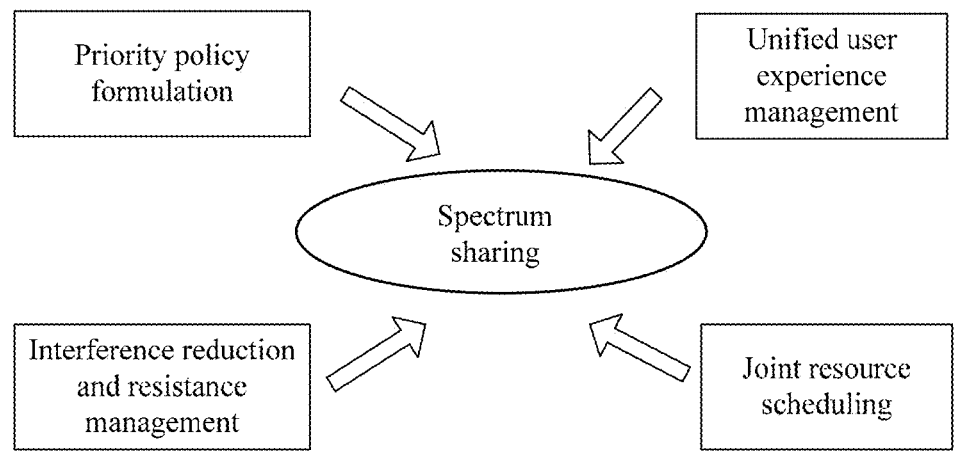
FIG. 5 is a schematic diagram of full spectrum sharing according to an embodiment of the present invention.

FIG. 5 is a schematic diagram of full spectrum sharing according to an embodiment of the present invention. With reference to FIG. 5, main content of the present invention is described in detail herein.

Spectrum Priority Policy Determining

For a spectrum shared between systems of a plurality of standards, to achieve a desirable effect, when resources can be subdivided, in frequency domain, between the standards, frequency division may be performed first to reduce interference between the systems. When the spectrum resources cannot be subdivided, priorities in using the spectrum resources need to be determined first. This is a basis for resolving a resource or performance conflict. The priorities in using the spectrum resources are comprehensively determined based on factors, such as spectrum efficiency of each standard, service characteristics of each standard, and network performance considerations of an operator.

A spectrum priority of each standard is comprehensively scored on a network side, and may be determined according to the following formula:

Spectrum priority score=$a$*System-occupied spectrum resource score+$b$*System service priority score+$c$*System user importance score Three scoring indicators are included. Each indicator should be scored for a system of each standard, and then comprehensive scoring is performed according to the foregoing formula.

1. System-Occupied Spectrum Resource Score

This score is determined based on both system-occupied resource bandwidth and system spectrum efficiency. System-occupied spectrum resource score=System spectrum efficiency/Spectrum resource bandwidth occupied by a system regular service. Spectrum efficiency is universally defined as a quantity of bits that can be transmitted per second on a unit bandwidth transmission channel in bit/s/Hz. The system-occupied resource bandwidth is usually spectrum resource bandwidth allocated to a typical service.

2. System Service Priority Score

This item is scored based on operator-specified importance of services and priorities of different services carried by each system. Service priority score of each system= $\Sigma$ [Priority of a service carried by the system*Importance factor of the service]. Different services have different carrying priorities, which are usually related to network performance indicator requirements of a specific system of the operator.

3. System User Importance Score

This score is mainly determined based on a proportion of important users in each system. If the proportion of important users is large, a reflected spectrum priority is higher.

a, b, and c are weighting factors of the three scoring items, and can be adjusted based on different network operation strategies, user marketing strategies, and the like, of the operator. A higher comprehensive spectrum priority score indicates a higher priority of a system in using the spectrum.

A spectrum shared between three standards GSM/UMTS/LTE is used as an example herein to describe a specific process of determining a spectrum priority on the network side. It is assumed that an operator mainly considers two types of services to be carried: voice and data. Importance factors of the two types of services are respectively: 0.7 for the voice service and 0.3 for the data service. Input conditions of remaining related scores of the GSM, UMTS, and LTE systems are shown in Table 1:

TABLE 1

| | Spectrum efficiency (0-10) | Spectrum bandwidth occupied by a regular service (0-5) | Priority of a voice service carried by a system (0-5) | Priority of a data service carried by a system (0-5) | System VIP user proportion (0-1) |
|---|---|---|---|---|---|
| GSM | 1 | 0.2 | 5 | 1 | 40% |
| UMTS | 5 | 5 | 3 | 2 | 60% |
| LTE | 10 | 1 | 2 | 5 | 85% |

1. GSM/UMTS/LTE-System-Occupied Spectrum Resource Score SpectrumScore
   SpectrumScore_GSM=1/0.2=5
   SpectrumScore_UMTS=5/5=1
   SpectrumScore_LTE=10/1=10

2. GSM/UMTS/LTE System Service Priority Score ServiceScore
   ServiceScore_GSM=0.7*5+0.3*1=3.3
   ServiceScore_UMTS=0.7*3+0.3*2=2.7
   ServiceScore_LTE=0.7*2+0.3*5=2.9

3. GSM/UMTS/LTE System VIP User Proportion VIPUserProportion
   VIPUserProportion_GSM=0.4*10=4
   VIPUserProportion_UMTS=0.6*10=6
   VIPUserProportion_LTE=0.8*10=8

If service carrying is the most important indicator, followed by a spectrum resource score and finally a VIP user proportion, the system priority weight factor b takes a larger value, followed by a, and finally c. Assuming that a, b, and c are respectively specified as 0.3, 0.6, and 0.1, spectrum priority scores SpectrumPriorityScore of the GSM/UMTS/LTE systems are respectively as follows:
   SpectrumPriorityScore_GSM=0.3*5+0.6*3.3+0.1*4=3.88
   SpectrumPriorityScore_UMTS=0.3*1+0.6*2.7+0.1*6=2.32
   SpectrumPriorityScore_LTE=0.3*10+0.6*2.9+0.1*8=2.54

Therefore, based on the foregoing system evaluation with comprehensive scoring, the GSM system has the highest priority in using spectrum resources, followed by the LTE system, and finally the UMTS system.

Unified User Experience Management

When systems of a plurality of standards share a spectrum, to enable a user to have better experience, it is necessary to consider a terminal type, a user service type, and aspects such as a degree of overlapping of interfering resources, so that the user can switch to a system of a most suitable standard when the user initially accesses a network or has established a connection to a network, so as to provide a continuously stable service environment for the user, reduce unnecessary inter-system switching, and provide the user with best service experience.

Based on whether the user already has a wireless connection to a mobile network, there are two modes: an access state and a connected state after classification. A process of interaction between a terminal, a base station, and a network side is separately described in detail below from a perspective of the two different states.

It needs to be noted that the base station in this embodiment of the present invention transmits signals of a plurality of standards, and the plurality of standards work on a same frequency spectrum.

User in the Access State

Figure 6:
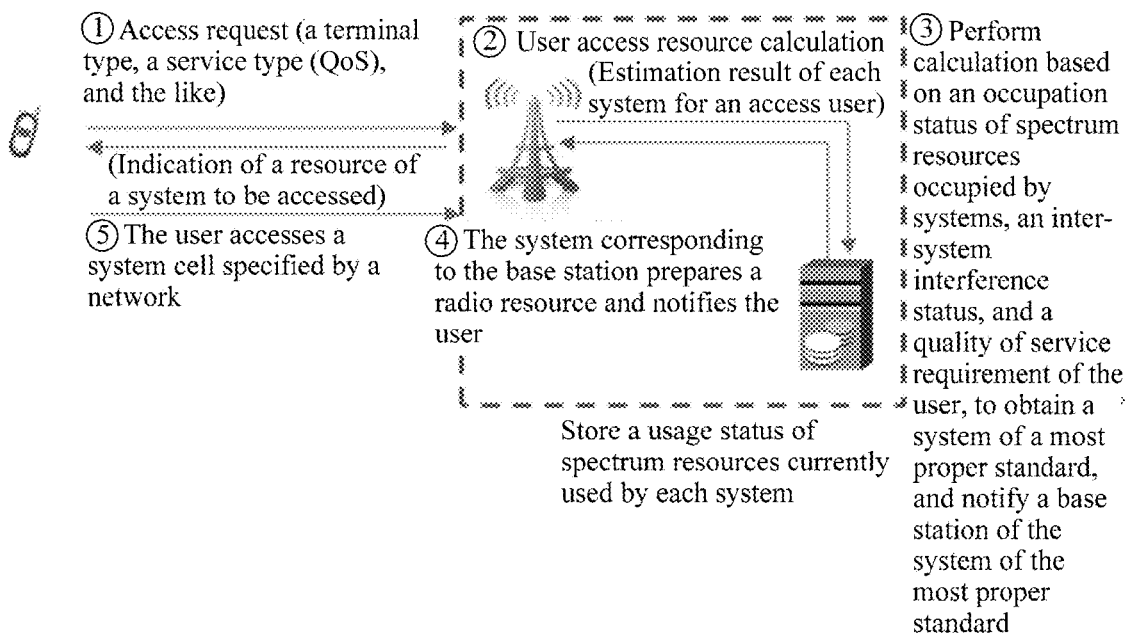
FIG. 6 is a schematic diagram of experience management of a user in an access mode according to an embodiment of the present invention.

FIG. 6 is a schematic diagram of experience management of a user in an access state according to an embodiment of the present invention. As shown in FIG. 6, a user has not yet established a connection to a base station on a network side, and the user initiates a service request and establishes a connection to a mobile network. In a network in which a plurality of standards fully share a spectrum, when the user initiates a service, the user should be connected to a system of a most proper standard that will provide a best service for the user. A detailed process is as follows:

Step 1: When an end user has a service requirement, the end user needs to establish a wireless connection to a network, and first sends an access network request to a base station, where the access network request also carries information such as a terminal type (supporting a system of what standard) and a service type (voice, data, or others), and the specific service type implicitly includes a quality of service (QoS) requirement, such as a rate or a bit error rate.

Step 2: After the multi-mode base station (a base station system shared between systems of a plurality of standards) receives the access request initiated by a terminal, the multi-mode base station first selects a to-be-evaluated network based on types of systems of standards supported by the terminal; calculates, based on a current running status of a system of each supported standard and a QoS requirement of a service of the user, time-frequency resources that need to be allocated to systems of the different standards; and then sends a preliminary-estimation result to a user experience management server.

Step 3: The user experience management server stores an occupation status of spectrum resources in each system; performs calculation, after receiving the preliminary-estimation result sent by the base station, to obtain a most proper bearer system based on the occupation status of the spectrum resources, inter-system interference, and a quality requirement of the user; and notifies the base station of the most proper bearer system.

Step 4: After receiving information about the system selected by the user experience management server, the base station prepares a radio resource, required for access of the user, in the system of the corresponding standard, and notifies the user of time-frequency information of the corresponding radio resource for the access, for example, a particular system frame and an access channel number.

Step 5: The end user accesses the specified system based on an indication from a network side, and at the same time the multi-mode base station notifies the user experience management server of a current spectrum occupation status for the user experience management server to store.

For example, in a 5 M spectrum of a current operator, an LTE system has occupied a spectrum of about 3 M. In this case, one user initiates a voice service. When accessing the network, the user notifies, in an access request, the network side that the user is a triple-mode terminal supporting GSM/UMTS/LTE and needs to initiate a voice service. If a policy of carrying, on the network side, the voice service is that the voice service can be carried only by a GSM network or a UMTS network, the network side separately estimates a to-be-allocated resource for the user whose voice service is to be carried by the GSM network or the UMTS network, and may allocate a channel on a 200 kHz carrier frequency to the GSM system and allocate a CS64K code channel to the UMTS system, so that the UMTS system occupies 5 M bandwidth (if a narrowband filter is used, spectrum resource occupation of the UMTS network may be reduced). The base station transmits the information to the user experience management server. The server stores a previous spectrum occupation status of each system, and analyzes a status of interference between systems with reference to a resource occupation status that is estimated by the base station. In this case, if a 200 k GSM channel is allocated, the 200 k GSM channel can be separated from a spectrum of the LTE system. Therefore, it is determined that the voice user accesses a GSM system, and this information is transmitted to the base station. The base station prepares a radio resource of the GSM system, and instructs the user to access the GSM system. The user accesses the GSM system based on a time and a channel that are indicated by the base station. The multi-mode base station notifies the server of an occupation status of a GSM system resource occupied by the user, for the server to store.

It needs to be noted that the base station in this embodiment of the present invention transmits signals of a plurality of standards, and the plurality of standards work on a same frequency spectrum.

User in the Connected State

Figure 7:
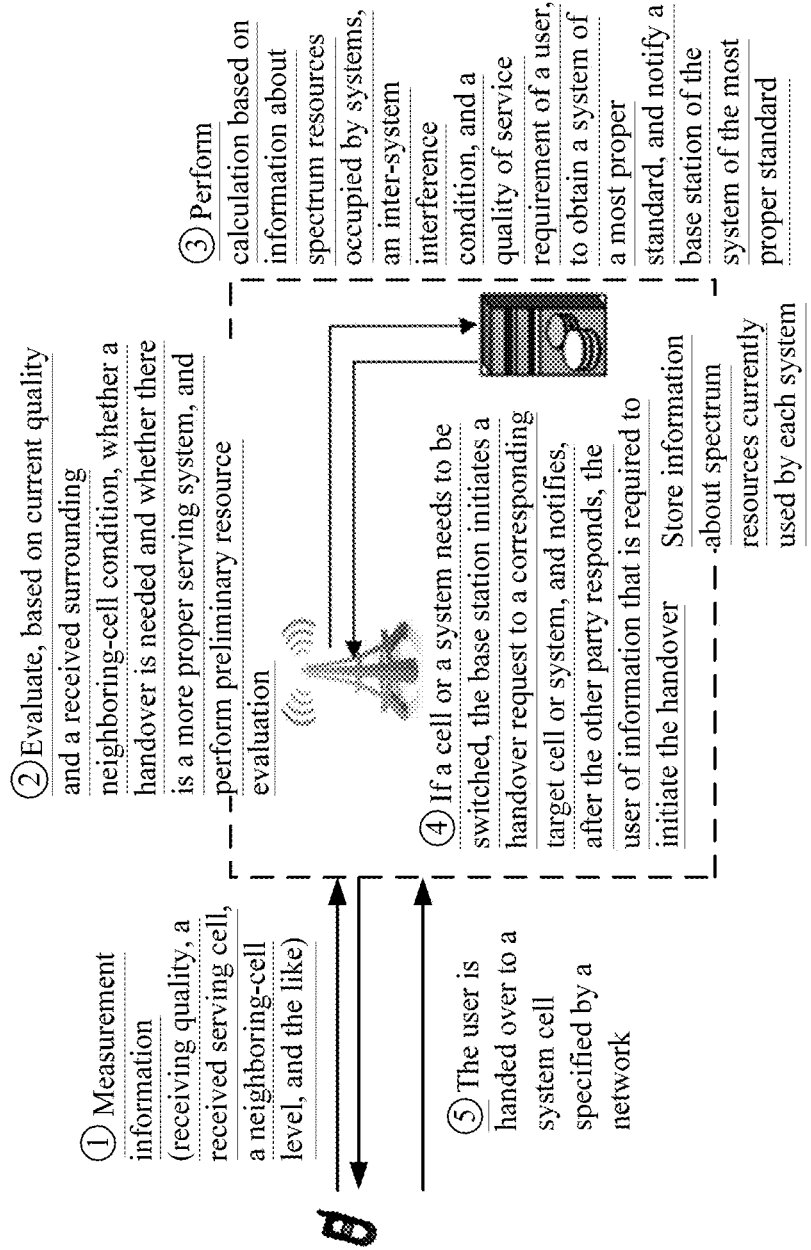
FIG. 7 is a schematic diagram of experience management of a user in a connected mode according to an embodiment of the present invention.

A user who already has a wireless connection to a particular system in a network is in the connected state. When a service provided by the network for the user is relatively stable, there is no need for adjustment. If the user is in a motion state, because a mobile wireless environment of the user changes, or an interference status of an accessed system changes due to an intra-system load change or another system resource occupation change, the network side should adjust the user to a most proper system in time, to continue to provide a best service for the user. FIG. 7 is a schematic diagram of experience management of a user in a connected state according to an embodiment of the present invention. A detailed process is as follows:

Step 1: When a user in the connected state moves or a network status of a system currently serving the user changes, the user reports, to a serving multi-mode base station periodically or when a particular quality of service condition (such as voice service quality, or a bit error rate of a data service) is met, measurement information measured by a terminal, such as received signal level/strength and signal quality of: a serving cell, a neighboring cell of the current system, and a neighboring cell of another different system.

Step 2: The multi-mode base station receives the measurement information reported by the user, and evaluates, based on a status quo, such as radio resources and loads of the current system and the another different system, whether the current user is in a relatively proper working state and whether a service of the current user meets a requirement; and if the service meets the requirement, does not perform any processing; or if the service does not meet the requirement, evaluates whether it is necessary to hand over the user to a new cell or system to meet the user requirement, and simultaneously sends a result of preliminary estimation of resource occupation to a user experience management server.

Step 3: Similar to the procedure of processing a user in the access state, the multi-mode base station transmits a preliminarily estimated resource that is required if another system is used instead to carry the service, to the user experience management server; when the user experience management server receives an estimation result from the base station, calculates a most proper bearer system with reference to a stored occupation status of spectrum resources occupied by each system, inter-system interference, and a quality requirement of the user; and notifies the base station of the most proper bearer system. The user experience management server will comprehensively consider a status of continuous coverage of various systems, to reduce factors such as unnecessary inter-system handover as much as possible.

Step 4: If a handover to a new cell or a new system is required, the multi-mode base station initiates a handover request to a target neighboring cell or system based on an indication; and, when the target neighboring cell or system accepts the request, prepares a resource required for the handover. A target base station notifies the currently serving base station, and the base station sends, to the terminal, access information (similar to information required during user access) required for handing over the user.

Step 5: The user stays in the original cell or is handed over to a new cell or a new system based on an indication from the base station. After a resource of the new cell or the new system is occupied, a corresponding base station notifies the user experience management server of a latest spectrum resource occupation status, and stores a latest spectrum resource occupation state.

Management of user experience of a user in the connected state is similar to that of a user in the access state, and details are not described again in this embodiment.

It needs to be noted that the base station in this embodiment of the present invention transmits signals of a plurality of standards, and the plurality of standards work on a same frequency spectrum.

Multi-Standard Joint Resource Scheduling

To use resources most properly and achieve a purpose of spectrum efficiency improvement, joint management of spectrum resources needs to be performed between systems of a plurality of standards. The joint resource management is performed by a base station, and a terminal in an active state in a network needs to occupy a channel based on a radio resource that is allocated by the base station. If the terminal needs to switch to another frequency band or another standard due to a reason such as coverage or capacity, a judgment condition and a process thereof are determined based on a specific network bearer strategy, and details are not described herein.

Joint Resource Scheduling in a Current Sector/Site

Systems of a plurality of standards fully share a spectrum. For a network side or a terminal, when interference cannot be eliminated from mixed signals, received simultaneously, of the plurality of standards to derive useful signals, frequency division still needs to be performed on spectrum resources. Based on resource requirements of the systems of the different standards, the spectrum resources are dynamically subdivided to the different systems. Required spectrum resources are first allocated to a high-priority standard, and other low-priority systems use, as much as possible, different frequency resources that are non-overlapping in frequency domain. Joint resource scheduling between systems of a plurality of standards in a current sector/site includes the following steps:

Step 1: A base station ranks scheduling priorities of the standards in the current sector/site.

Step 2: The base station determines a minimum scheduling time-frequency unit required by a current highest-priority standard, and checks whether there is currently an available resource greater than or equal to the unit; and if there is currently an available resource greater than or equal to the unit, allocates a resource to a to-be-scheduled user based on the following principles; or if there is currently no available resource greater than or equal to the unit, proceeds to step 3.

When the base station performs resource scheduling, the base station follows a principle of Time Domain First and Frequency Domain Next, and tries to make spectrums used by users in each standard remain consecutive or centralized.

During scheduling for each standard, a minimum spectrum granularity required by each standard is used as a unit. A currently available frequency or a currently available channel on a spectrum is first used up. Resources on one spectrum unit are not occupied until time domain resources on another unit spectrum have been allocated.

If some or all time-frequency resources on each unit spectrum have been allocated to a standard having a higher priority, the base station needs to select, based on a time difference between the systems of the standards and frame structure characteristics of the systems, some unallocated time-frequency resources for use.

It needs to be noted that the base station in this embodiment of the present invention transmits signals of a plurality of standards, and the plurality of standards work on a same frequency spectrum.

Figure 8:
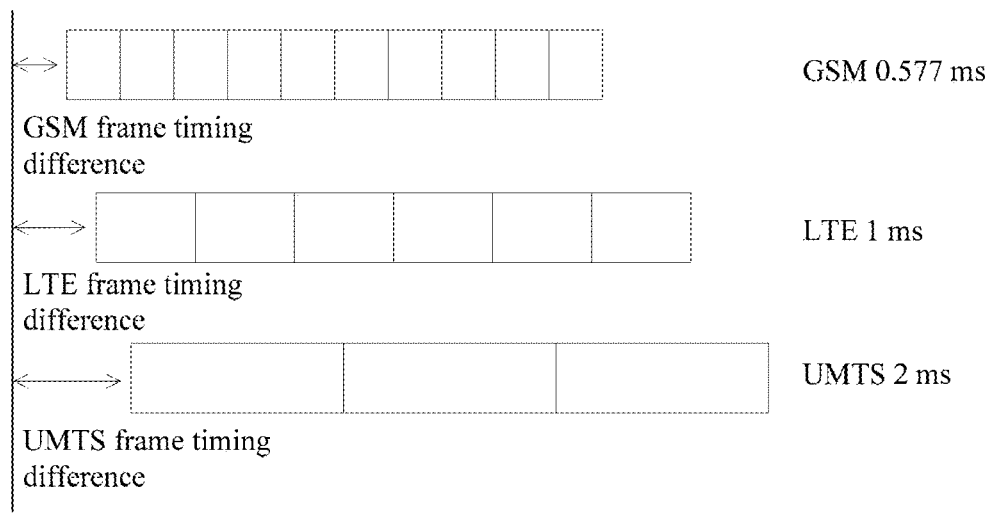
FIG. 8 is a schematic diagram of time sequence relationships of systems of different standards according to an embodiment of the present invention.

FIG. 8 is a schematic diagram of time sequence relationships of systems of different standards according to an embodiment of the present invention, and shows a time relationship of a frame structure of each system. A relationship of resource scheduling between the systems may be calculated based on a frame timing difference of each system relative to an absolute time. Then time segments in which the systems occupy spectrum resources may be determined.

Step 3: The base station deletes, from a standard priority list, a standard for which resource allocation is complete.

Step 4: If there is no to-be-scheduled standard in the standard priority list, step 5 continues; otherwise, step 2 continues.

Step 5: End.

Still using an example in which three standards GSM/UMTS/LTE share a sector and share a spectrum, the standards sorted in descending order of priorities are respectively: GSM, LTE, and UMTS. To simplify a service model, resource allocation in an uplink direction is used as an example. It is assumed that when a scheduling moment arrives, a GSM service in a particular sector needs to occupy two full-rate channels. Then two neighboring slots on a same carrier are first allocated to the GSM service. If an LTE service needs a total of 25 RB resources, independent RB resources are first allocated based on a service priority sequence, and then some time-frequency resources on RBs with a same frequency as the GSM system are allocated. If the UMTS system also has a demand for radio resources and the base station determines that there is no available time-frequency resource in a current scheduling period, a UMTS user cannot be scheduled until a next period.

It needs to be noted that the base station in this embodiment of the present invention transmits signals of a plurality of standards, and the plurality of standards work on a same frequency spectrum.

Figure 9A:
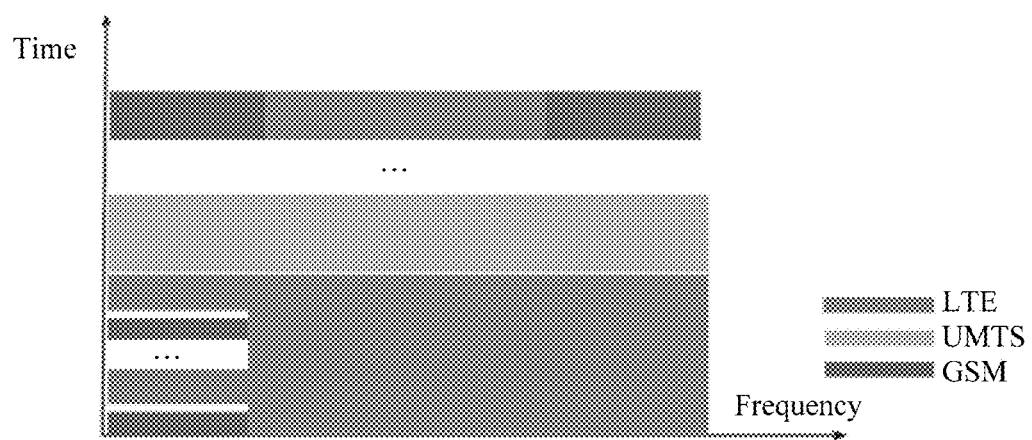
FIG. 9a is a schematic diagram of frequency division of systems of different standards in different time segments according to an embodiment of the present invention.

FIG. 9a is a schematic diagram of frequency division of systems of different standards in different time segments according to an embodiment of the present invention. As shown in FIG. 9a, spectrum resources are subdivided in different manners based on requirements of each system in different time segments. In this way, interference caused by frequency overlapping between the systems is avoided from a perspective of time while the systems share a same spectrum resource.

Joint Resource Scheduling Together with a Neighboring Sector/Site

The foregoing content resolves a problem of joint resource scheduling in one sector/site. In an actual network, during joint resource scheduling, in addition to considering a problem of interference between systems of a current sector/site, an interference relationship between the current sector/site and a surrounding sector/site also needs to be considered. In addition, to achieve highest possible spectrum efficiency, the current sector/site should be able to share a same spectrum resource with another sector/site, to implement intra-frequency resource reuse.

Figure 9B:
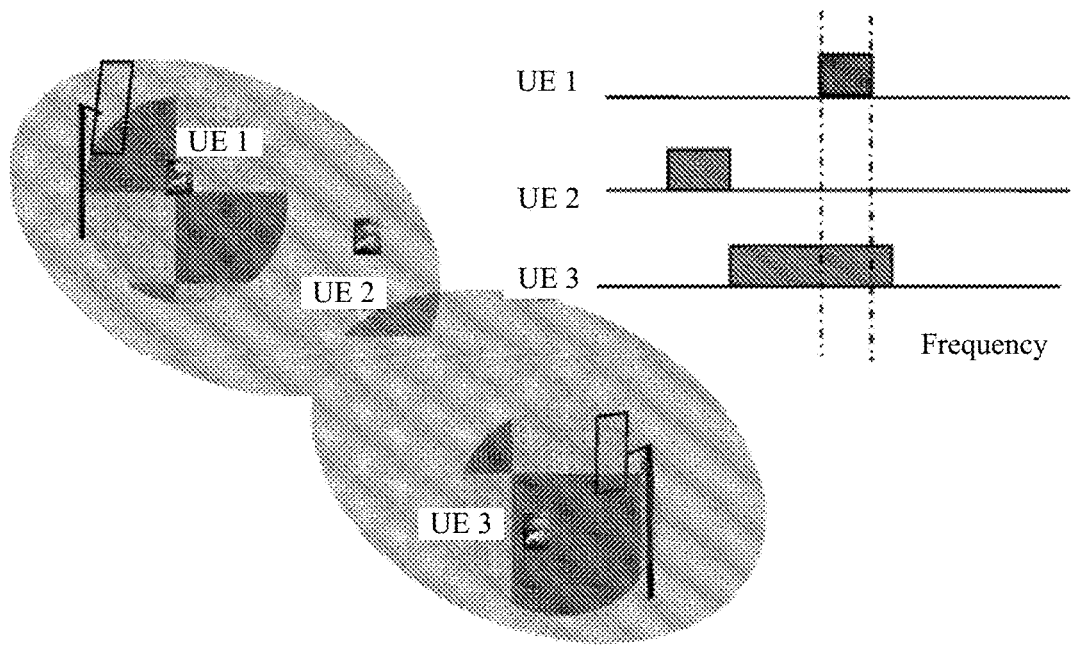
FIG. 9b is a schematic diagram of frequency division of systems of different standards in different time segments according to an embodiment of the present invention.

For systems of different standards in a neighboring site, a range of users who use a same spectrum resource and have co-channel interference to each other may be controlled, so that only users at a center of a cell are allowed to use a resource that has a same frequency as the heterogeneous systems of the neighboring site. FIG. 9b is a schematic diagram of joint resource scheduling together with a neighboring sector/site according to an embodiment of the present invention. For example, for users in a dark area in FIG. 9b, isolation at such a distance can reduce co-channel interference between systems, so that resources can be reused at a same frequency. In addition, transmit power intensity of systems with intra-frequency reuse may be reduced, to reduce mutual interference between the systems, so that two systems can safely share a same spectrum resource.

For example, a GSM cell A and an LTE cell B are two sectors of neighboring sites, respectively. If the cell A and the cell B need to share a part of spectrum resources, scheduling steps of the two cells are as follows:

Step 1: A base station marks exclusive spectrums and shared spectrums of the two cells A and B respectively based on GSM and LTE spectrum configuration and usage.

Step 2: The base station determines load statuses (where a load greater than LoadThreshold is a high load, and a load less than LoadThreshold is a low load) of the two cells A and B respectively in real time. If the load statuses are low, step 3 continues. If the load statuses are high, step 4 continues.

Step 3: In a light-load status, the base station allocates only the exclusive spectrum to a user and step 7 continues.

Step 4: After entering a heavy-load status, the base station determines a position of a user based on a current-cell level value and a neighboring-cell level value that are measured by a terminal. When the current-cell level value SCellRxLev>SCellRxLevThreshold 1, the user is a near-end user. When SCellRxLev<SCellRxLevThreshold 2, the user is a far-end user. When SCellRxLevThreshold 1≥SCellRxLev≥SCellRxLevThreshold 2, a position type of the user is determined based on the neighboring-cell level value NCellRxLev measured by the terminal. The foregoing NCellRxLev may be a value of an inter-standard intra-frequency level measured between the two cells A and B, or may be a measured value of a signal level of an intra-standard neighboring cell of the other cell, where the intra-standard neighboring cell has a same sector and same coverage as the other cell. For example, the cell A may directly measure the cell B, or may measure a GSM cell C that has a same sector as the cell B; and the cell B may directly measure the cell A, or may measure a GSM cell D that has a same sector as the cell A. If NCellRxLev≤NCellRxLevThreshold, the user is a near-end user. If NCellRxLev>NCellRxLevThreshold, the user is a far-end user.

Step 5: The base station allocates a resource to the user based on the position of the user. Only a resource of the exclusive spectrum can be allocated to a far-end user, and all available spectrum resources can be allocated to a near-end user.

Step 6: If there is still a to-be-scheduled user, step 2 continues; or if there is no to-be-scheduled user, step 7 continues.

Step 7: End.

It needs to be noted that the base station in this embodiment of the present invention transmits signals of a plurality of standards, and the plurality of standards work on a same frequency spectrum.

Other Joint Resource Scheduling Technologies Based on Characteristics of Various Standards Based on different characteristics of systems of various mobile communications standards, there are also other joint resource scheduling solutions for specific systems.

For example, when a plurality of carriers can be enabled on systems UMTS/LTE/5G a portion that has a same frequency with another standard may be used as a secondary carrier of CA/DC/MC. Some spectrum resources of the secondary carrier may be flexibly occupied or released in real time based on a status of change in interference. The LTE/5G system may also utilize the secondary carrier, by skipping transmitting a control channel, to reduce interference to a shared spectrum. In this case, joint resource scheduling between the LTE/5G system and a system of the another standard becomes more flexible and convenient.

For example, two sectors: a sector A and a sector B of neighboring sites use a same spectrum F1, to deploy a UMTS system and an LTE system respectively. If the two sectors respectively have other different intra-standard frequencies UMTS F2 and LTE F3, F1 can be used as a secondary carrier of F2 or F3. A base station determines, based on a load condition and a position of a user, whether to use the secondary carrier and transmit power of the secondary carrier.

It needs to be noted that the base station in this embodiment of the present invention transmits signals of a plurality of standards, and the plurality of standards work on a same frequency spectrum.

Joint Interference Reduction and Resistance Technology

Figure 10:
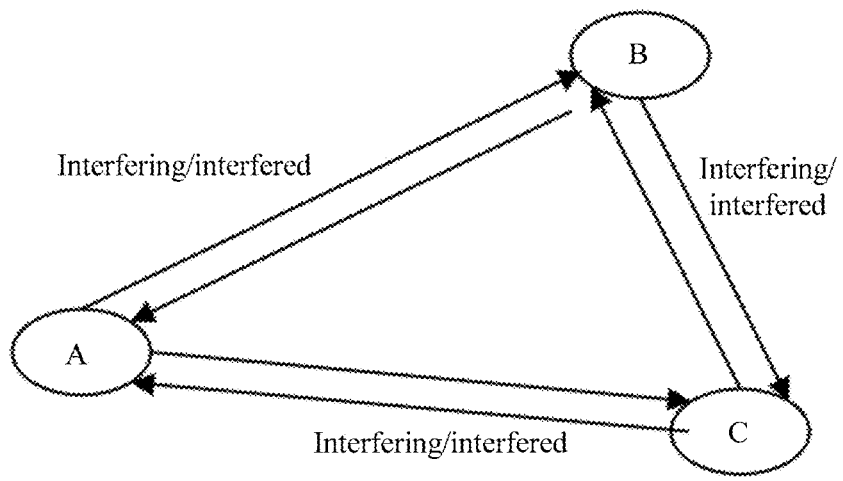
FIG. 10 is a schematic diagram of mutual interference between systems according to an embodiment of the present invention.

FIG. 10 is a schematic diagram of mutual interference between systems according to an embodiment of the present invention. As shown in FIG. 10, a plurality of standards fully share a spectrum. A system of any of the standards and systems of the other standards are in an interfering/interfered relationship. For an interfering system, it is necessary to consider reducing its interference to the other systems as much as possible. For an interfered system, it is necessary to enhance its ability to resist interference from the other systems.

Interference between the systems of the plurality of standards may be classified, based on a status of simultaneous spectrum occupation, into co-channel interference and adjacent-frequency interference. The co-channel interference means partial or complete overlapping of spectrum resources used between the plurality of systems. The adjacent-frequency interference is interference that still exists due to diffusion between spectrums of the systems when the spectrums of the systems do not overlap with each other but are very close to each other. Therefore, for spectrum sharing, in addition to proper allocation and use of resources as mentioned in the foregoing description, an interference reduction and resistance technology based on an interference characteristic also needs to be combined, so that the systems of the plurality of standards can work properly during spectrum sharing, and spectrum efficiency can be improved when the systems of the plurality of standards perform spectrum sharing. For each system, it is necessary to reduce its interference to the other systems as much as possible and improve its capability to resist interference from the other systems.

The following describes an interference reduction and resistance technology introduced for full spectrum sharing.

Co-Channel Interference Cancellation

Figure 11:
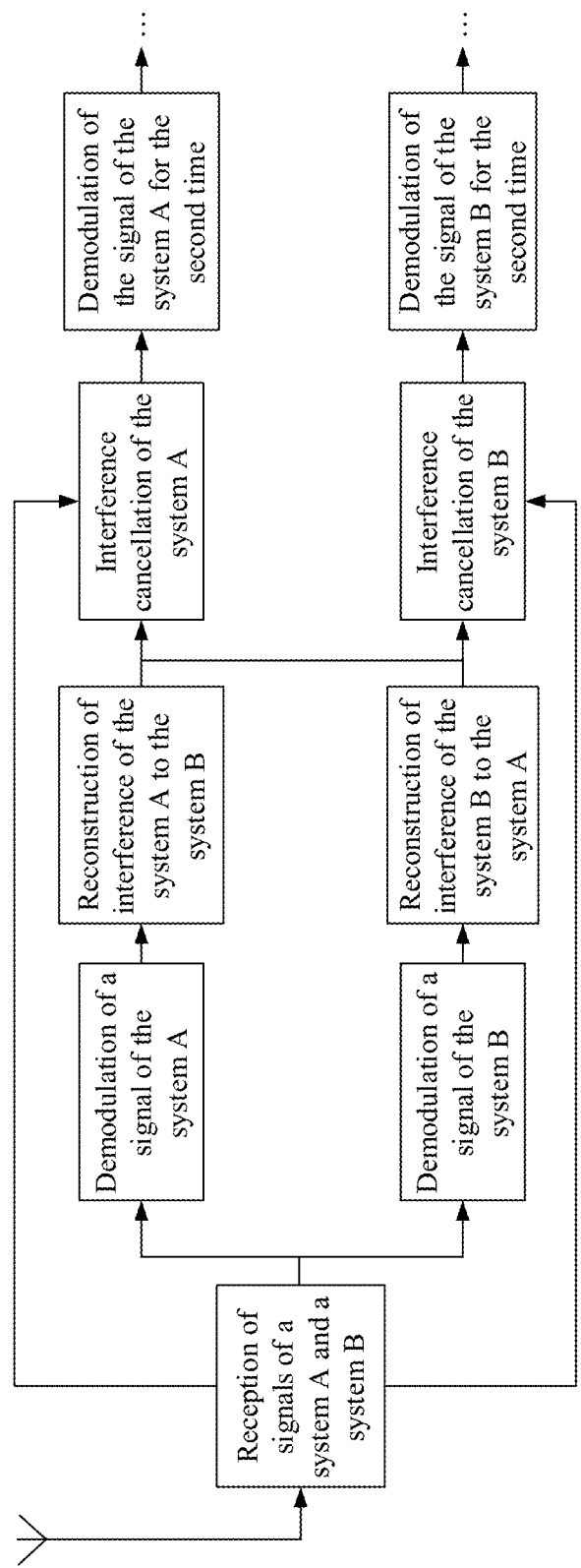
FIG. 11 is a schematic diagram of co-channel interference cancellation according to an embodiment of the present invention.

FIG. 11 is a schematic diagram of co-channel interference cancellation according to an embodiment of the present invention. As shown in FIG. 11, when co-channel interference exists between an interference signal and an interfered signal, regardless of a base station or a terminal, if the interference signal and the interfered signal simultaneously use a same radio frequency channel, when receiving a useful signal of a system of a same standard, a receiver will demodulate and reconstruct a received interference signal from a system of another standards, so that the interference signal can be eliminated.

A spectrum shared between standards GSM/UMTS/LTE is still used as an example. Because a GSM system occupies relatively limited spectrum resources and only occupies 200 kHz in a 5 M spectrum, co-channel interference between the GSM system and a UMTS system or an LTE system may be avoided in a frequency division manner. However, spectrum resources occupied by the UMTS and LTE systems are relatively wide, and spectrum overlapping inevitably exists. For the UMTS or LTE system, signals of the LTE or UMTS system are all co-channel interference signals. To separate their own useful signals from interference signals, the UMTS system and the LTE system need to jointly perform co-channel interference cancellation. Using reception on a base station side as an example, signals of the UMTS system and the LTE system are received by a filter whose bandwidth is 5 M. UMTS system signal demodulation is performed for the first time on one channel of the received signals, and at the same time an interference signal of the UMTS system to the LTE system is reconstructed and then sent to an intra-frequency signal cancellation module of the LTE system. LTE system signal demodulation is performed for the first time on the other channel of the received signals, and at the same time an interference signal of the LTE system to the UMTS system is reconstructed and then sent to an intra-frequency signal cancellation module of the UMTS system. After intra-frequency interference cancellation of the UMTS system and the LTE system, useful signals of the UMTS and LTE systems are obtained, and then are sent to respective demodulation modules of the UMTS and LTE systems to perform signal demodulation for the second time. In this way, system-interfering signals are suppressed from co-channel interference signals, and useful signals are derived, making possible intra-frequency reception of the UMTS system and the LTE system.

Sieve Filter

Figure 12:
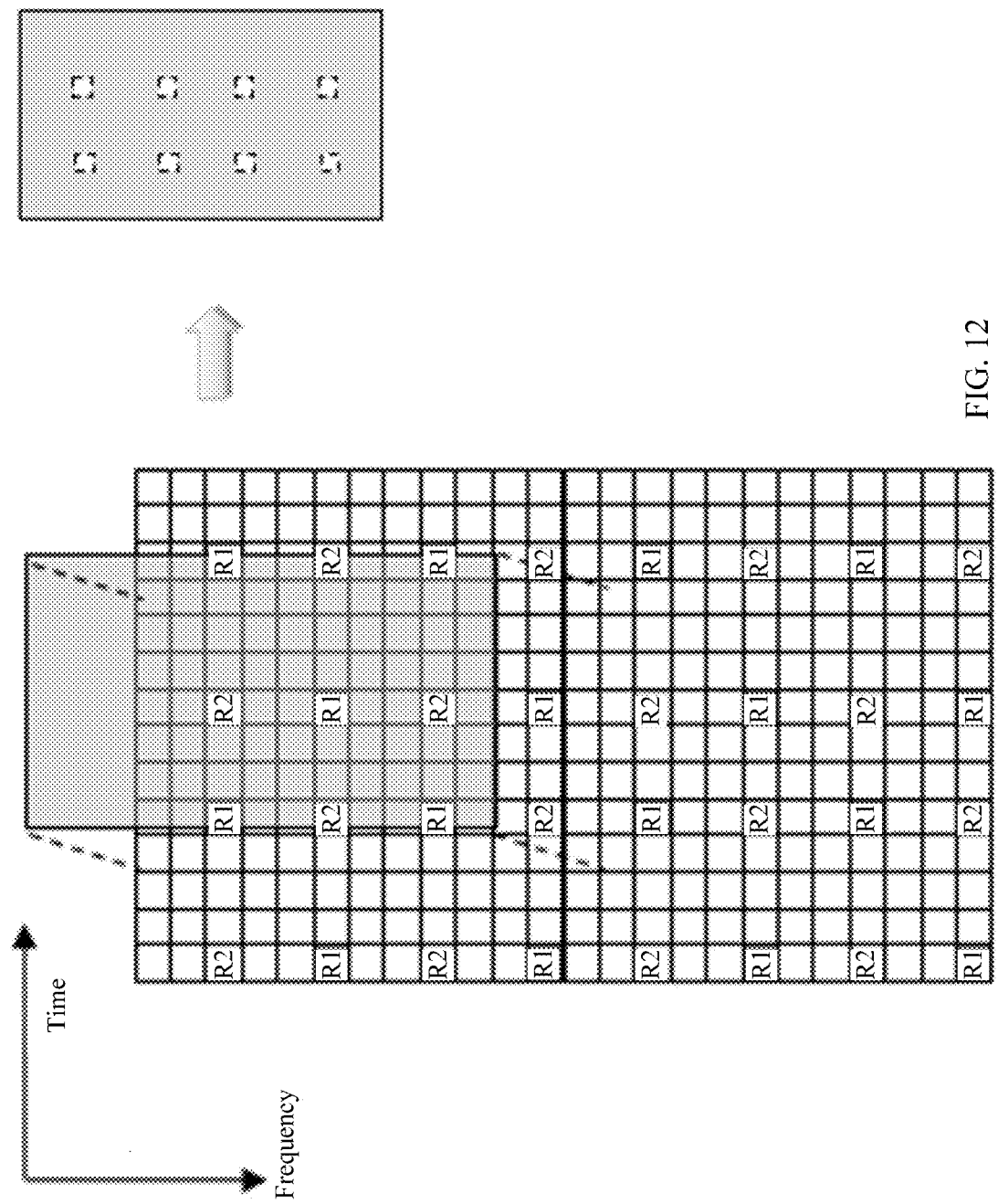
FIG. 12 is a schematic diagram of a sieve filter according to an embodiment of the present invention.

FIG. 12 is a schematic diagram of a sieve filter according to an embodiment of the present invention. As shown in FIG. 12, broadcast and control channels of each system are key channel information. For a low-priority system or a system whose current traffic is relatively light, a time-frequency resource corresponding to a key channel, for example, a pilot channel or a control channel, that affects a high-priority system may be filtered out, so that interference to another system is reduced by impairing partial performance of the system itself.

For an LTE system prior to UMTS or R13, control channels and pilot channels are distributed in full system bandwidth. Because a UMTS system and an LTE system are broadband systems as compared with a GSM system, a power spectrum density of a GSM system is far higher than that of a UMTS system or an LTE system. In a scenario of intra-frequency reuse of a GSM system and a UMTS system and/or an LTE system, to reduce impact of the GSM system on a key channel of the UMTS system or the LTE system, a time-frequency resource corresponding to the key channel of the UMTS system or the LTE system may be filtered out from inside the GSM system. The following figure shows a time-frequency relationship between a GSM system (an orange block) and an LTE system. The GSM system filters out a time-frequency resource that overlaps with an LTE pilot, so that interference to the LTE system can be reduced, to improve pilot performance of the LTE system.

Masquerading Signal

When systems of a plurality of standards share spectrum resources, if one of the systems does not have a service to be carried in some time periods and does not need to transmit broadcast or pilot information, time-frequency resources in these time periods may be used to transmit a signal of a system of another standard. In this way, residence of a user of a current system is not affected, and performance of the system of the another standard can be improved.

Figure 13:
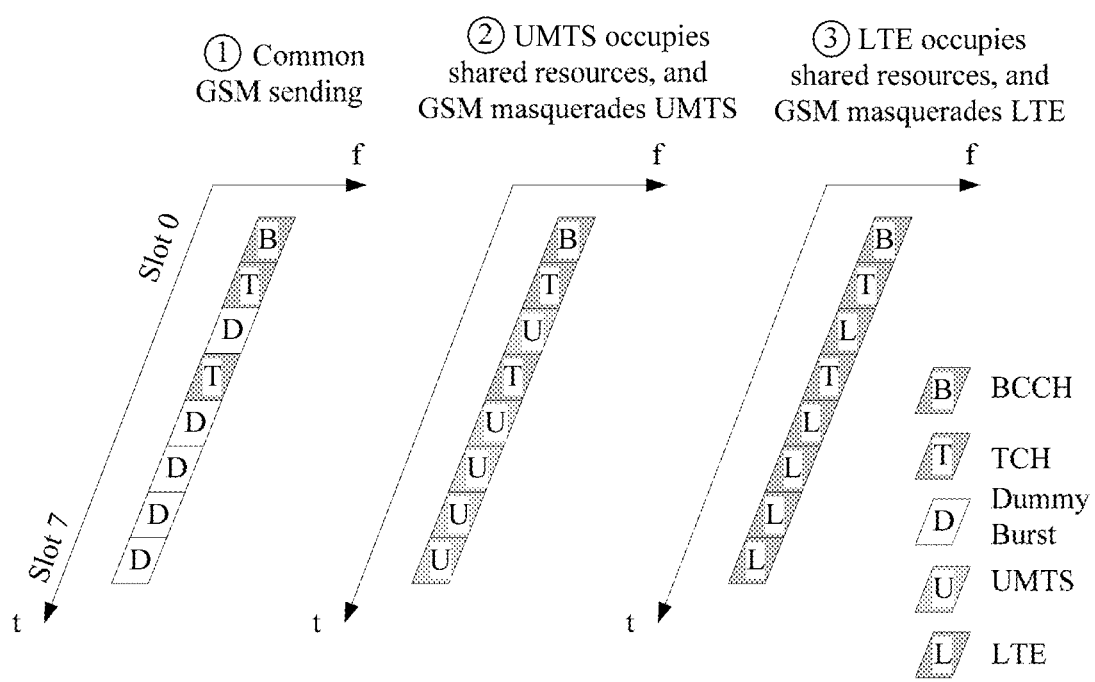
FIG. 13 is a schematic diagram of a GSM masquerading signal according to an embodiment of the present invention.

Using a GSM system as an example, one carrier occupies a 200 kHz spectrum, and has eight slots. On a carrier frequency in which a BCCH is located, for a slot in which a BCCH/SDCCH/TCH service is not sent, a dummy burst (Dummy Burst) originally needs to be sent, and is co-channel interference to a system of another standard. To reduce interference to the system of the another standard, control channel information or data information, on a corresponding frequency resource, of an LTE system or a UMTS system may be transmitted in these idle slots. As shown in FIG. 13:

A dynamic filter isolates adjacent-frequency interference between different systems.

Regardless of whether the filter is added on a network side or on a terminal side, a range of a signal spectrum can be limited in a transmit direction, to control interference, caused by spectrum diffusion, to a system of another standard; and, in a receive direction, filtering can also suppress received interference from the system of the another standard. When a plurality of standards fully share a spectrum, the spectrum cannot be statically partitioned. It is necessary to dynamically enable a proper filter based on a status of spectrum resources that are occupied by a service. The dynamic filter can better partition, in frequency domain, spectrum resources used by systems of various standards, to control spectrum interference between neighboring systems.

Figure 14:
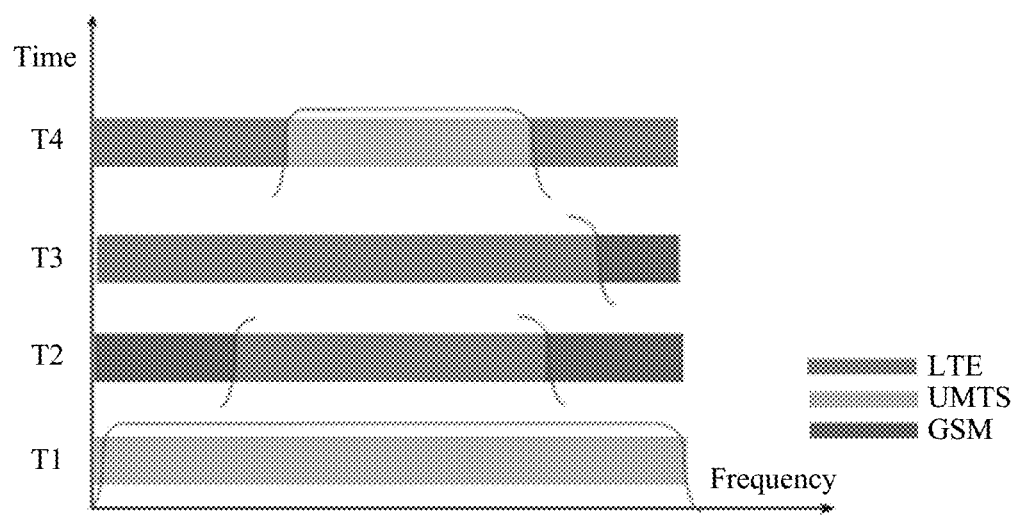
FIG. 14 is a schematic diagram of a dynamic filter according to an embodiment of the present invention.

FIG. 14 is a schematic diagram of a dynamic filter according to an embodiment of the present invention. As shown in FIG. 14, a dynamic filter for full spectrum sharing by GSM/UMTS/LTE is used as an example. At a moment T1, based on a traffic condition of each system, only a UMTS user needs to occupy a spectrum resource, and only some common control channels of a GSM system and an LTE system are performing sending. In this case, the UMTS user may occupy an entire 5 M spectrum. At a moment T2, resources of the 5 M spectrum are allocated to the GSM system and the LTE system for use. In addition, because the GSM system is busy at this moment, relatively substantial spectrum resources are allocated to the GSM system. At a moment T3, the resources of the 5 M spectrum are still allocated to the GSM system and the LTE system for use. As traffic of the GSM system decreases, more spectrum resources are available for the LTE system for use. At a moment T4, the spectrum resources are allocated to the UMTS system and the LTE system for use. For the UMTS system at the moment T1 and at the moment T4, a 5 M filter and a filter whose bandwidth is small, for example, 2.4 M, are respectively applied, and the filters are dynamically switched based on a service requirement. For the LTE system at the moment T2 and at the moment T3, to isolate interference between the LTE system and the GSM system, the two filters are dynamically switched.

Embodiment 2 of the Present Invention

In Embodiment 1 of the present invention, a current most common FDD system is used as an example to describe a case in which systems of a plurality of standards may fully share a same spectrum resource. The technologies in Embodiment 1 may also be applied to another FDD system such as a CDMA system, or another TDD system such as a TD-SCDMA system, to implement full sharing of spectrum resources. Likewise, the contents in Embodiment 1 are also universally applicable to emerging future communications systems.

Embodiment 3 of the Present Invention

Embodiment 1 of the present invention places an emphasis on a minimum requirement of a system integrating GSM/UMTS/LTE, and describes full spectrum sharing of resources on a 5 MHz spectrum. When spectrum resources of an operator are more than 5 MHz, the technologies in Embodiment 1 of the present invention are also applicable. In addition, if spectrum resources are sufficient for systems of a plurality of standards, some spectrum resources may be shared, so that the resources are more properly utilized and a better service is provided to a user.

Beneficial effects of the embodiments of the present invention are as follows:

The present invention is about full spectrum sharing in a real sense, and may be applied to various mainstream frequency bands in current mobile communications and may be applied to different spectrum bandwidth. According to the present invention, resources are jointly scheduled and managed between systems of a plurality of communications standards in combination with a terminal type, a service requirement, and a requirement of an operator; and co-channel interference reconstruction and elimination, a sieve filter, signal masquerading, a dynamic filter, and the like are implemented based on a characteristic that a current base station or terminal can simultaneously transmit or receive signals of systems of a plurality of standards, thereby reducing interference to another system and improving an interference resistance capability of a useful signal. Spectrum resources are always most precious resources in a mobile communications system. The technologies in the present invention can help an operator deploy a communications system that integrates a plurality of standards within most finite spectrum resources. In this way, the operator can not only provide a most essential service based on a requirement of an old end user, but also effectively utilize spectrum resources to enable a system of a highly-efficient standard based on a requirement for a new service and a brand competitiveness requirement, thereby maximizing efficiency of the spectrum resources.

It needs to be noted that the base station in the embodiments of the present invention transmits signals of a plurality of standards, and the plurality of standards work on a same frequency spectrum.

Technical key points and protection points of the present invention include the following:

Signals of systems of a plurality of standards may fully share a same spectrum, and the systems of the plurality of standards may concurrently work.

When the systems of the plurality of standards are concurrently working, normal working of a system of a highest-priority standard is ensured based on priorities of the standards.

When the systems of the plurality of standards are concurrently working, a system of each standard filters out or deducts a corresponding data channel or a corresponding control/synchronization channel that affects a system of a standard currently using the spectrum, to reduce an impact of interference.

A system of a standard that is currently using a shared resource may masquerade to transmit a signal of a system of another standard in time domain, to reduce an impact on the system of the another standard.

When the systems of the plurality of standards are concurrently working, spectrum resources are jointly scheduled and managed in combination with inter-system interference in a current cell/site and interference between neighboring sites.

In addition, it needs to be noted that the spectrum resource allocation method and apparatus for full spectrum sharing provided in the embodiments of the present invention may be implemented on a network-side base station, or may be implemented on a user-side terminal.

What is claimed is:

1. A spectrum resource allocation method for full spectrum sharing, comprising:
   obtaining, by a base station in real time, a network access request message sent by a terminal, wherein the network access request message comprises at least one of a network standard supported by the terminal, an access service of the terminal, or quality of service (QoS) of the access service;
   dynamically allocating, by the base station, full spectrum resources of an operator to different network standards based on the network access request message, wherein dynamically allocating the full spectrum resources includes increasing, by the base station, spectrum resource allocation to the network standard supported by the terminal; and
   sending, by the base station, a first network standard access indication message to the terminal, wherein the terminal accesses a service based on the first network standard access indication message via a corresponding network standard.

2. The method according to claim 1, further comprising:
   sending, by the base station, signals of a plurality of different network standards to the terminal, wherein the signals of the plurality of different network standards work on a same spectrum resource; and
   communicating, by the base station, with the terminal via the same resource spectrum.

3. The method according to claim 1, wherein the dynamically allocating, by the base station, full spectrum resources to different network standards based on the network access request message comprises:
   separately obtaining, by the base station and based on the access service of the terminal and the QoS of the access service, time-frequency resources that are occupied by the different network standards during service access; and
   allocating, by the base station, the full spectrum resources to the different network standards based on the time-frequency resources that are occupied by the different network standards.

4. The method according to claim 1, wherein the dynamically allocating, by the base station, full spectrum resources to different network standards based on the network access request message comprises:
obtaining, by the base station, network priorities of the different network standards based on the network access request message; and
allocating, by the base station, the full spectrum resources to the different network standards based on a sequence of the network priorities.

5. The method according to claim 4, further comprising:
obtaining, by the base station, measurement information sent by the terminal;
when it is determined based on the measurement information that communication quality of the terminal cannot meet the QoS of the access service, allocating, by the base station, the full spectrum resources to the different network standards based on the network priorities; and
sending, by the base station, a second network standard access indication message to the terminal, wherein the terminal accesses a service based on the second network standard access indication message via a corresponding network standard.

6. The method according to claim 4, wherein the obtaining network priorities of the different network standards comprises:
separately obtaining, by the base station, a score of a spectrum resource used by each network standard supported by the terminal, a score of a access service priority, and a score of a user importance index;
separately obtaining, by the base station, a weight corresponding to the score of the spectrum resource, a weight corresponding to the score of the access service priority, and a weight corresponding to the score of the user importance index; and
calculating, by the base station, the network priorities of the different network standards based on the score of the spectrum resource, the score of the access service priority, the score of the user importance index, the weight corresponding to the score of the spectrum resource, the weight corresponding to the score of the access service priority, and the weight corresponding to the score of the user importance index.

7. The method according to claim 1, further comprising:
separately obtaining, by the base station, first uplink data that is sent via a first network standard by the terminal and second uplink data that is sent via a second network standard by the terminal, wherein a spectrum resource used by the first network standard partially or completely overlaps with a spectrum resource used by the second network standard; and
separately performing, by the base station, interference processing on the first uplink data and the second uplink data.

8. A spectrum resource allocation apparatus for full spectrum sharing, comprising:
a receiver, the receiver configured to obtain, in real time, a network access request message sent by a terminal, wherein the network access request message comprises at least one of a network standard supported by the terminal, an access service of the terminal, or quality of service (QoS) of the access service;
at least one processor, the at least one processor configured to dynamically allocate full spectrum resources of an operator to different network standards based on the network access request message, wherein dynamically allocating the full spectrum resources includes increasing spectrum resource allocation to the network standard supported by the terminal; and
a transmitter, the transmitter configured to send a first network standard access indication message to the terminal, wherein the terminal accesses a service based on the first network standard access indication message via a corresponding network standard.

9. The apparatus according to claim 8, wherein:
the transmitter is further configured to send signals of a plurality of different network standards to the terminal, wherein the signals of the plurality of different network standards work on a same spectrum resource; and
the at least one processor is further configured to communicate with the terminal via the same resource spectrum.

10. The apparatus according to claim 8, wherein:
the at least one processor is further configured to separately obtain, based on the access service of the terminal and the QoS of the access service, time-frequency resources that are occupied by the different network standards during service access; and
the at least one processor is further configured to allocate the full spectrum resources to the different network standards based on the time-frequency resources that are occupied by the different network standards.

11. The apparatus according to claim 8, wherein:
the receiver is further configured to obtain network priorities of the different network standards based on the network access request message; and
the at least one processor is further configured to allocate the full spectrum resources to the different network standards based on a sequence of the network priorities.

12. The apparatus according to claim 11, wherein:
the receiver is further configured to obtain measurement information sent by the terminal;
the at least one processor is further configured to:
when it is determined based on the measurement information that communication quality of the terminal cannot meet the QoS of the access service, allocate the full spectrum resources to the different network standards based on the network priorities; and
the transmitter is further configured to send a second network standard access indication message to the terminal, wherein the terminal accesses a service based on the second network standard access indication message via a corresponding network standard.

13. The apparatus according to claim 11, wherein:
the receiver is further configured to separately obtain a score of a spectrum resource used by each network standard supported by the terminal, a score of a access service priority, and a score of a user importance index;
the receiver is further configured to obtain a weight corresponding to the score of the spectrum resource, a weight corresponding to the score of the access service priority, and a weight corresponding to the score of the user importance index; and
the at least one processor is further configured to calculate the network priorities of the different network standards based on the score of the spectrum resource, the score of the access service priority, the score of the user importance index, the weight corresponding to the score of the spectrum resource, the weight corresponding to the score of the access service priority, and the weight corresponding to the score of the user importance index.

14. The apparatus according to claim 8, wherein:
the receiver is further configured to separately obtain first uplink data that is sent via a first network standard by the terminal and second uplink data that is sent via a second network standard by the terminal, wherein a spectrum resource used by the first network standard partially or completely overlaps with a spectrum resource used by the second network standard; and
the at least one processor is further configured to separately perform interference processing on the first uplink data and the second uplink data.

\* \* \* \* \*